(12) United States Patent
Thornbrue et al.

(10) Patent No.: US 10,380,409 B2
(45) Date of Patent: Aug. 13, 2019

(54) METHOD FOR ESTIMATING A 3D TRAJECTORY OF A PROJECTILE FROM 2D CAMERA IMAGES

(71) Applicant: Blast Motion Inc., Carlsbad, CA (US)

(72) Inventors: James Thornbrue, San Diego, CA (US); Patrick Cherveny, San Marcos, CA (US); Juergen Haas, Poway, CA (US)

(73) Assignee: Blast Motion Inc., Carlsbad, CA (US)

( * ) Notice: Subject to any disclaimer, the term of this patent is extended or adjusted under 35 U.S.C. 154(b) by 71 days.

(21) Appl. No.: 15/815,696

(22) Filed: Nov. 16, 2017

(65) Prior Publication Data
US 2019/0147219 A1  May 16, 2019

(51) Int. Cl.
*G06K 9/00* (2006.01)
*G06T 7/246* (2017.01)
*G06T 1/00* (2006.01)

(52) U.S. Cl.
CPC .......... *G06K 9/00208* (2013.01); *G06T 7/251* (2017.01); *G06T 1/0007* (2013.01); *G06T 2207/10004* (2013.01); *G06T 2207/10016* (2013.01); *G06T 2207/30241* (2013.01)

(58) Field of Classification Search
CPC ............. G06K 9/3241; G06K 9/00664; G06K 9/6278; H04N 7/181; G06T 7/254; G06T 7/277; G06T 7/292; G06T 7/20; G06T 7/80; G06T 7/70; G06T 2207/30241; G01S 19/48; G01S 5/0263; A63B 2024/0034; A63B 2220/35; A63B 2220/30; A63B 2024/0028
See application file for complete search history.

(56) References Cited

U.S. PATENT DOCUMENTS

| | | | | |
|---|---|---|---|---|
| 2004/0032970 | A1* | 2/2004 | Kiraly | A63B 24/0021 382/103 |
| 2006/0008116 | A1* | 1/2006 | Kiraly | G06T 7/20 382/103 |
| 2008/0312010 | A1* | 12/2008 | Marty | A63B 24/0003 473/447 |
| 2009/0067670 | A1* | 3/2009 | Johnson | A63B 71/0605 382/100 |

(Continued)

*Primary Examiner* — Neil R Mikeska
(74) *Attorney, Agent, or Firm* — Arc IP Law, PC; Joseph J. Mayo (57) ABSTRACT

A method that estimates the 3D trajectory of a projectile, such as a golf ball or baseball, by analyzing a sequence of images from a single-lens, 2D camera. Image analysis may be used to locate the projectile in the camera images, using motion detection and filters for the projectile's expected size and shape. A physics model may be used to calculate the projectile's trajectory as a function of its initial position and velocity (for example, just after impact with a golf club or bat). A camera projection transform may map this trajectory into predicted pixel locations, which may be compared to the observed projectile locations in the camera images. The projectile's trajectory may be estimated by finding initial conditions that minimize differences between observed and predicted pixel locations, using a nonlinear least squares solver for example. The method may be extended to multiple cameras.

20 Claims, 10 Drawing Sheets
(3 of 10 Drawing Sheet(s) Filed in Color)

(56) References Cited

U.S. PATENT DOCUMENTS

| | | | |
|---|---|---|---|
| 2010/0210377 A1* | 8/2010 | Lock | A63B 24/0003 |
| | | | 473/409 |
| 2014/0016829 A1* | 1/2014 | Chen | G06T 7/20 |
| | | | 382/107 |
| 2014/0180451 A1* | 6/2014 | Marty | G09B 19/0038 |
| | | | 700/91 |
| 2014/0301598 A1* | 10/2014 | Marty | G06T 7/246 |
| | | | 382/103 |
| 2015/0324636 A1* | 11/2015 | Bentley | G11B 27/17 |
| | | | 386/227 |
| 2016/0379074 A1* | 12/2016 | Nielsen | G06K 9/3241 |
| | | | 348/143 |
| 2018/0032082 A1* | 2/2018 | Shalev-Shwartz | |
| | | | B60W 30/0953 |

\* cited by examiner

METHOD FOR ESTIMATING A 3D TRAJECTORY OF A PROJECTILE FROM 2D CAMERA IMAGES

BACKGROUND OF THE INVENTION

Field of the Invention

One or more embodiments of the invention are related to the fields of motion analysis and image processing. More particularly, but not by way of limitation, one or more embodiments of the invention enable a method that estimates a 3D trajectory of a projectile based on 2D camera images of the projectile in motion.

Description of the Related Art

Estimation of the trajectory of a projectile is a common objective in many fields, such as ballistics or sports. In sports in particular, it may be desirable to estimate the trajectory of a struck object, such as a baseball or a golf ball. There are known solutions that use radar or radar combined with vision to measure the exit velocity, launch angle, and field angle of a ball after impact, and that predict the resulting trajectory of the ball from these measurements. Some of these systems also estimate ball spin. Illustrative systems using radar include FlightScope™ Trackman™, and Hittrax™. These systems require specialized radar equipment.

Another solution known in the art for estimating a projectile trajectory is to use a dual camera system, which relies on bifocal vision to estimate depth. An illustrative system using this approach is Foresight™. These systems require stereo cameras.

Single lens cameras that capture 2D images are widely available and inexpensive. For example, these cameras are integrated in many mobile devices. However, there are no known methods for estimating the 3D trajectory of a projectile, such as a ball for example, based on the images obtained from a single lens camera.

For at least the limitations described above there is a need for a method for estimating a 3D trajectory of a projectile from 2D camera images.

BRIEF SUMMARY OF THE INVENTION

One or more embodiments described in the specification are related to a method for estimating a 3D trajectory of a projectile from 2D camera images. One or more embodiments may analyze camera images from a single lens camera to calculate an estimated trajectory in space of a projectile, such as a hit ball. This analysis may use optimization techniques to fit a trajectory model to the observed pixel locations of the projectile in the 2D camera images. This technique may be extended to multiple cameras. Unlike a traditional dual camera system with side-by-side lenses, a multi-camera system may use images from multiple cameras in any locations and orientations to determine the 3D trajectory of a projectile.

One or more embodiments may calculate estimated projectile initial conditions (such as the position and velocity vectors for the projectile immediately after impact) by minimizing the differences between observed pixel locations of the projectile in a sequence of 2D camera images and the modeled pixel locations of the projectile based on a trajectory model. The modeled pixel locations may be calculated as a function of the projectile initial conditions, by combining a physics model of projectile motion relative to a world reference frame with a camera projection transform that maps points in a world reference frame into pixel positions in camera images. Using the estimated projectile initial conditions, one or more embodiments may calculate a 3D trajectory of the projectile. This trajectory may be extended indefinitely through time and space, or until for example the projectile hits the ground or otherwise stops moving. Based on the estimated 3D trajectory, one or more embodiments may calculate metrics such as for example, without limitation, the carry distance of the projectile, which is the horizontal distance the projectile travels until it hits ground or a horizontal plane.

A physics model of projectile motion may for example model the forces on the projectile. Forces may include for example, without limitation, any or all of gravity, drag, and Magnus effect force due to spin. For physics models that include spin effects, an initial spin of the projectile may be estimated or measured.

A projectile may be for example, without limitation, a golf ball, a baseball, a softball, a soccer ball, a football, a hockey puck, a tennis ball, a table tennis ball, a squash ball, a racket ball, a shuttlecock, a handball, a lacrosse ball, a field hockey ball, a volleyball, a kickball, a horseshoe, and a lawn dart.

One or more embodiments may calculate a camera projection transform that maps points in a world reference frame into pixel locations in 2D camera images. This camera projection transform may for example be calculated as the composition of a transformation from the world frame into a camera reference frame (which may be conceptually fixed to the camera), and a projection transform from the camera frame into pixel coordinates in an image.

In one or more embodiments, the projection transform between the camera reference frame and pixel coordinates may depend on one or more camera parameters. One or more of these parameters may be determined by measuring the size in pixels of an object of a known physical size, viewed at a known distance.

In one or more embodiments, the transform from the world reference frame into the camera reference frame may depend on the orientation of the camera in the world reference frame. In one or more embodiments, this orientation may be determined using one or more sensors coupled to the camera, such as for example a three-axis accelerometer that measures the direction of gravity in the camera frame. The transform between the world frame and the camera frame may for example be a rotation that rotates the downward gravity vector in the world frame into the measured gravity vector from the accelerometer.

One or more embodiments may analyze the 2D camera images to determine the pixel locations of the projectile in these images. An initial step that may be used in one or more embodiments to locate the projectile is to locate moving objects in the camera images, using for example a three-frame difference algorithm. In one or more embodiments, the three-frame differences may be smoothed, and then isolated peaks in the smoothed differences may be identified as potential pixel locations of the projectile.

For projectiles that are balls or are otherwise round, potential pixel locations of the projectile may be filtered to retain only objects that are substantially round in shape and that match the expected size of the projectile in the images. An algorithm for finding round objects that may be used in one or more embodiments calculates a centroid and average distance from the centroid for object regions, and generates a disc around the centroid with a radius of 1.5 times the average distance; an object may be considered round if the density of object pixels within this disc exceeds a density threshold.

With a single 2D camera, a pixel location in a camera image cannot be mapped unambiguously to a single point in 3D space. Therefore, one or more embodiments may fix one coordinate of the initial position of the projectile, based for example on a measured or assumed distance between the camera and the projectile at the beginning of flight. One or more embodiments may also obtain or calculate an initial time at which the initial conditions of the projectile hold. The initial conditions may have five unknown coordinates: two unknown position coordinates, and three unknown velocity coordinates. These unknown coordinates may be estimated by minimizing differences between observed pixel locations of the projectile in camera images and the predicted pixel locations as a function of these unknown coordinates. For example, one or more embodiments may use a nonlinear least-squares algorithm to find the estimated initial conditions. The predicted pixel locations for any initial conditions may be calculated using a physics model for the initial projectile trajectory and a camera projection transform to map world reference frame coordinates into pixel locations. The physics model for the initial projectile trajectory may for example include any or all of gravity, drag, and Magnus effect forces.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

A method for estimating a 3D trajectory of a projectile from 2D camera images will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
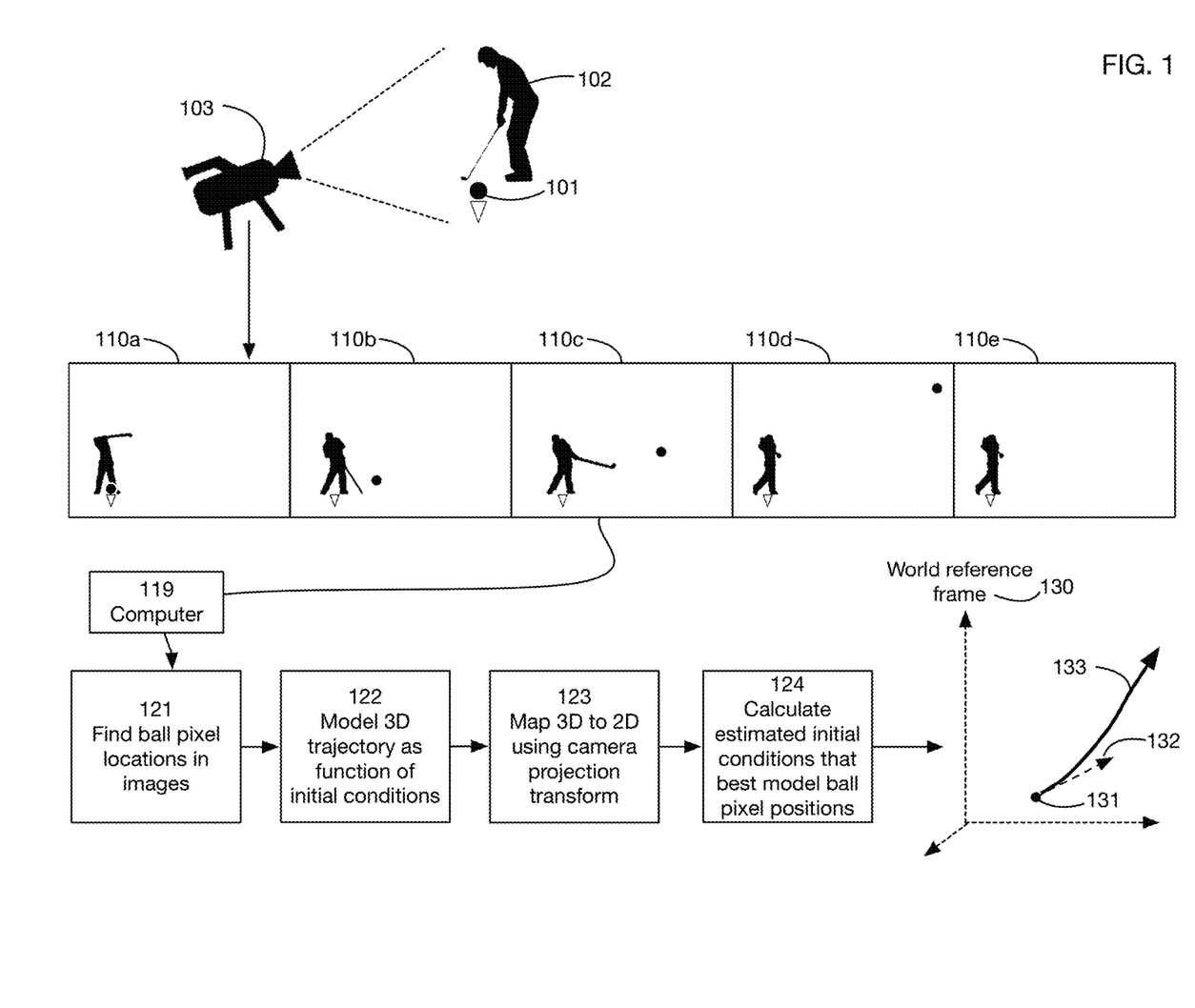
FIG. 1 illustrates an embodiment of the invention that calculates a 3D trajectory of a golf ball from a sequence of camera images containing the ball.

FIG. 1 shows an example of a procedure for estimating a 3D trajectory of a projectile from a sequence of 2D camera images of the projectile. In this illustrative example, projectile 101 is a golf ball, which is hit by golfer 102. One or more embodiments may estimate the trajectory of any type or types of projectile, including for example, without limitation, a golf ball, a baseball, a softball, a soccer ball, a football, a hockey puck, a tennis ball, a table tennis ball, a squash ball, a racket ball, a shuttlecock, a handball, a lacrosse ball, a field hockey ball, a volleyball, a kickball, a horseshoe, and a lawn dart. Projectiles may be hit, thrown, kicked, shot, tossed, flung, bounced, pushed, pulled, launched, or dropped using any type or types of equipment or using human force or natural forces. Projectiles may travel through any medium, including without limitation, through air or through water. Projectiles may in some situations travel along surfaces or tracks.

Camera 103 captures images of the golf ball as it travels after impact. In one or more embodiments, camera 103 may be any type of camera or image capture device. For example, it may be a single-lens camera that captures 2D images. The camera may be a video camera, or a camera that captures individual images. It may be a normal speed video camera (such as a camera that captures video at 30 frames per second) or a high-speed video camera operating at any frame rate. Camera 103 may be integrated into any other equipment, such as for example a mobile phone. In one or more embodiments, camera 103 may be multiple cameras. For example, a multi-camera system may use single (or dual) lenses at multiple locations that are operating independently. In one or more embodiments, camera 103 may be stereo camera with dual lenses, which may for example use the difference in pixel locations between the two images to estimate distance.

Camera 103 captures images 110a, 110b, 110c, 110d, and 110e. Each image is a 2D image. In this example, images 110a, 110b, 110c, and 110d contain images of projectile 101; image 110e does not contain an image of the projectile because it has exited the field of view of the camera. In general, in one or more embodiments any number of images may be captured by a camera (or by multiple cameras), and any subset of these images may contain images of the projectile of interest. One or more embodiments may use the images containing the projectile to estimate the 3D trajectory of the projectile.

An illustrative process that may be used in one or more embodiments to estimate a 3D trajectory is shown in steps 121, 122, 123, and 124. In one or more embodiments, computer 119 processes the images, and the computer may be internal to camera 103 or separate. In either case, the computer is configured to specific implement steps to processing the images as follows, noting that any other computer architecture including distributed or embedded computers in any architecture may be utilized with embodiments described herein. In step 121, the projectile pixel location is determined in one or more of the camera images. In step 122, a model is generated or obtained that determines a 3D trajectory for the projectile as a function of initial conditions (such as the launch velocity and position of the golf ball immediately after impact). In step 123, a camera projection transform is determined that maps from 3D positions to 2D pixel locations. In step 124, estimated initial conditions are calculated to best match predicted pixel locations of the projectile with the observed pixel locations determined in step 121. The result of these steps is a set of estimated initial conditions such as initial position 131 and initial velocity 132, and a resulting 3D trajectory 133 of the projectile with respect to a world reference frame 130. The world reference frame 130 may be any desired reference frame such as a frame fixed to a location on the Earth or to any desired object.

Figure 2:
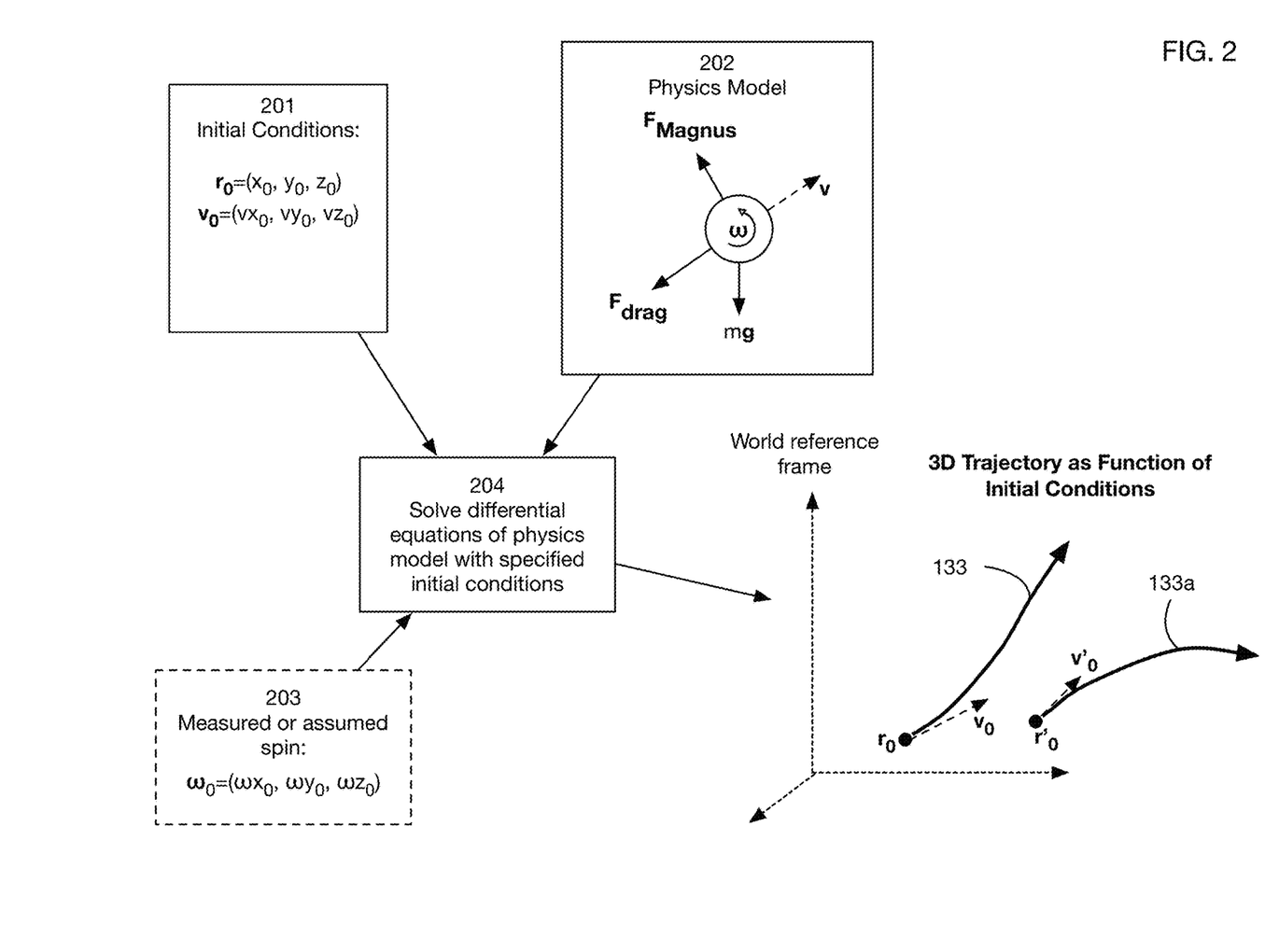
FIG. 2 illustrates how one or more embodiments of the invention may use a physics model to determine a 3D trajectory as a function of the measured or assumed initial conditions of the projectile.

FIG. 2 illustrates a procedure that may be used for step 122 of FIG. 1 in one or more embodiments. Initial conditions 201 may be for example the three-dimensional initial position vector and three-dimensional initial velocity vector for the projectile, at a selected initial time (such as just after impact), with respect to a world reference frame. In one or more embodiments, initial conditions may also include an initial spin vector 203, which may be measured or assumed (such as based on average spins for particular types of trajectories like golf ball flight). Spin may be measured for example using markings on a ball or other projectile; spin rates up to the Nyquist frequency (e.g., 7200 rpm at a frame rate of 240 Hz) are directly observable, and the rate of change or other a priori information may be used to resolve aliasing if it is present. Another approach to estimating spin may be to use a larger field of view to capture more of the projectile's flight, and to fit the observed pixel locations of the projectile to a trajectory model that includes spin rate to jointly estimate all of the model's parameters. If no direct measurements of spin are available, then a nominal spin rate may be assumed, which may be based on factors such as the type of projectile, the type of equipment hitting the projectile (such as a type of golf club), and the launch velocity vector of the projectile.

A physics model 202 may be developed or obtained, which may for example describe the forces on the projectile over time. Forces may for example include any or all of gravity, drag, and lift due to the Magnus effect. One or more embodiments may use a simplified physics model for the projectile that omits any or all of these forces. For example, a simple physics model for the initial trajectory of a golf ball after impact may ignore all forces and may treat the ball flight as purely inertial, where the ball continues moving at its initial velocity. Another simplified physics model may include the force of gravity only. In step 204, the 3D trajectory of the projectile is derived by solving the differential equations of motion specified by the physics model 202, using the initial conditions 201 (and possibly 203). This process 204 generates a 3D trajectory as a function of the initial conditions, which may be unknown. Thus different initial conditions result in different 3D trajectories of the projectile. For example, initial conditions ($r_0$, $v_0$) may generate 3D trajectory 133, but different initial conditions ($r'_0$, $v'_0$) may generate a different 3D trajectory 133a.

Figure 3:
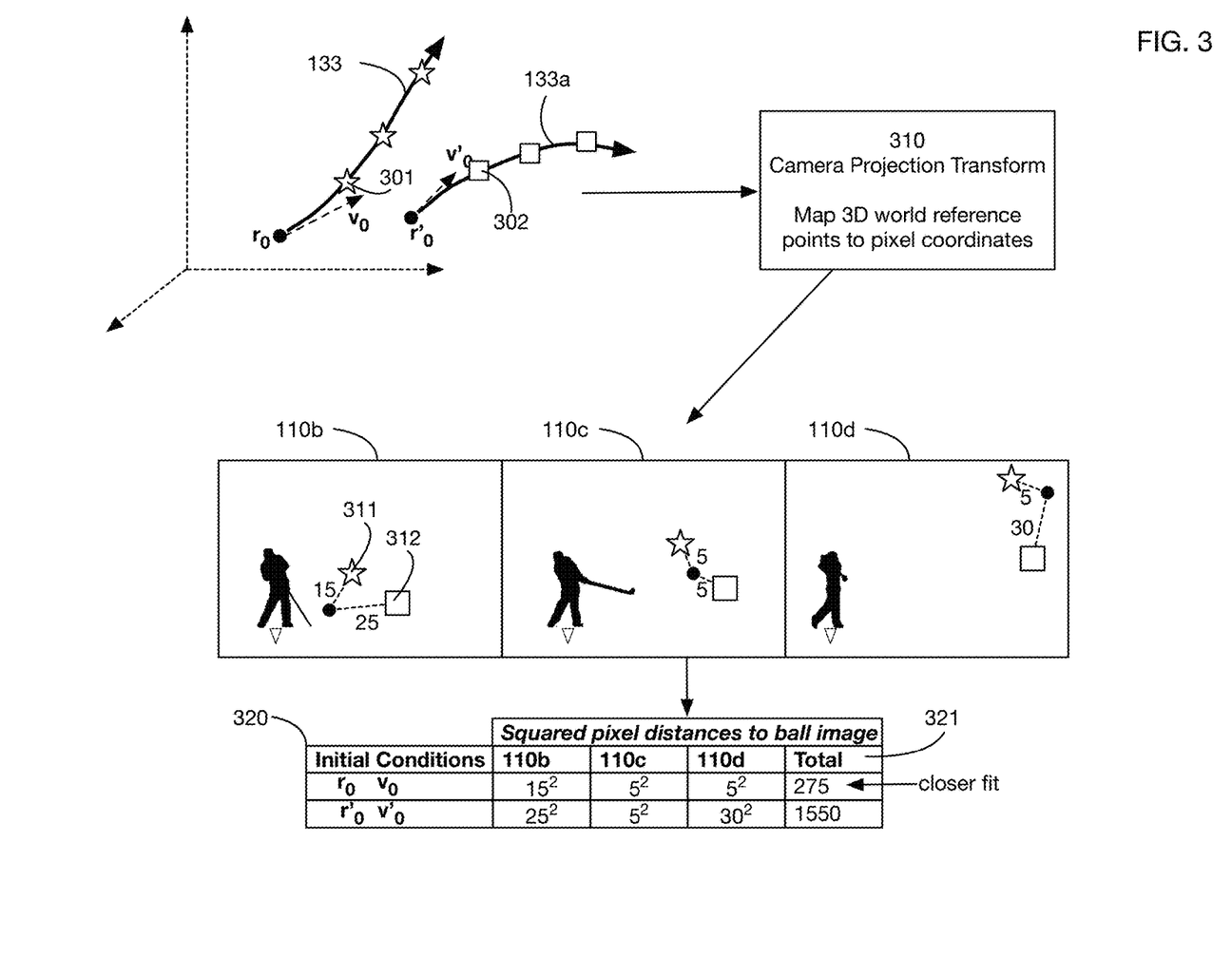
FIG. 3 continues the example of FIG. 2 to illustrate how a hypothetical 3D trajectory is projected onto a camera image plane so that the projected pixel position of the projectile may be compared to the observed position in camera images.

FIG. 3 continues the example of FIG. 2 and illustrates a procedure that may be used for steps 123 and 124 of FIG. 1 in one or more embodiments. A camera projection transform 310 is obtained or calculated to map 3D coordinates from the world reference frame into pixel coordinates within a camera image. Using this transform 310, the 3D trajectories such as 133 and 133a may be mapped into corresponding pixel locations within camera images. For example, point 301 on 3D trajectory 133 is mapped into pixel location 311 in frame 110b, and point 302 on 3D trajectory 133a is mapped into pixel location 312 in frame 110b. Distances between the mapped pixel locations and the actual pixel locations of the projectile are then used to determine how closely each 3D trajectory matches the sequence of camera images. For example, table 320 calculates the total squared distances 321 between predicted and observed projectile pixel locations for the trajectories 133 and 133a, which correspond to different initial conditions. This illustrative calculation shows that trajectory 133 is a closer fit to the observed projectile pixel locations, because the sum of squared distances between the transformed trajectory locations and the observed pixel locations is lower than the corresponding sum of squared distances for trajectory 133a. In one or more embodiments, a search may be performed for estimated initial conditions that provide a best fit to the observed pixel locations; for example, a best fit may be one that minimizes the sum of squared distances 321 between projected pixel locations (based on the assumed initial conditions) and the observed pixel locations. This search for optimal initial conditions may be performed using any desired algorithm. For example, in some situations a closed form solution may be available for the estimated initial conditions that minimize the squared error 321. In one or more embodiments, a numerical optimization method may be used to find the estimated initial conditions. For example, without limitation, a nonlinear least squares solver such as the iterative Levenburg-Marquardt algorithm may be used to find the estimated initial conditions. In one or more embodiments, a closeness-of-fit measure other than the sum of squared distances may be used, and any algorithm may be used to find estimated initial conditions that minimize (or approximately minimize) this measure.

Figure 4:
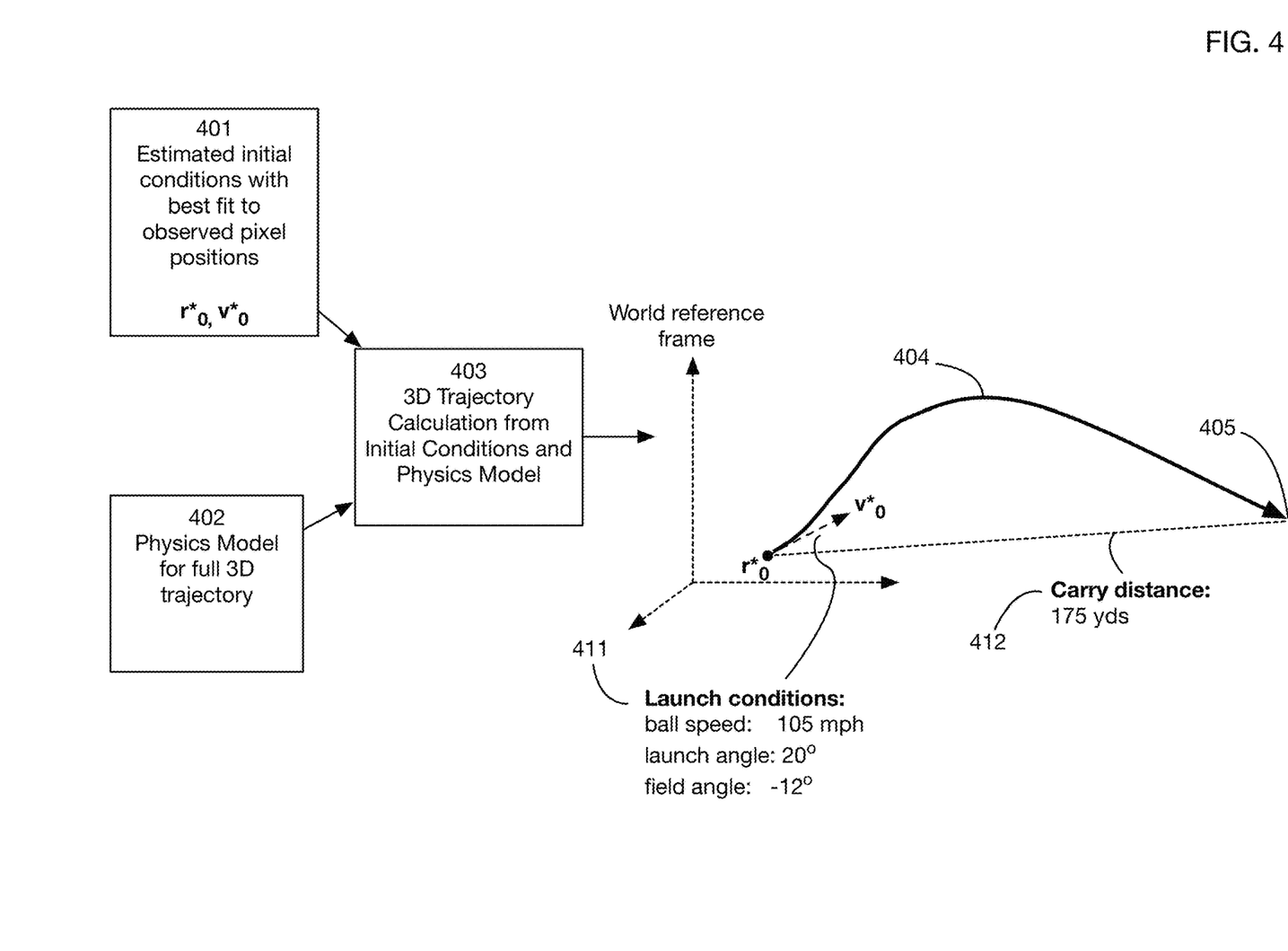
FIG. 4 illustrates calculation of a full 3D trajectory of a projectile, along with derived metrics such as carry distance, based on the estimated initial conditions.

After estimated initial conditions are calculated (for example, to find a close or optimal fit to the observed pixel locations), a 3D trajectory for the projectile flight may be calculated using these initial conditions. This 3D trajectory may encompass the entire flight of the projectile, rather than just the initial period of flight that may be observed by the camera. FIG. 4 illustrates this process. Estimated initial conditions 401 are calculated as described with respect to FIG. 3. A physics model 402 is calculated or obtained for the full 3D trajectory. This physics model 402 may be the same as or different from a physics model used to fit the initial conditions to the observed pixel locations; for example, a physics model for the fitting of initial conditions may ignore certain forces, if desired, to simplify the fitting procedure. As an illustration, a physics model for the determination of initial conditions may include gravity but ignore drag, ball spin and Magnus forces, while a model for the full 3D trajectory may incorporate drag and spin effects (using, for example, a measured or estimated ball spin). Step 403 then calculates complete 3D trajectory 404 from the initial conditions 401 and the physics model 402. This trajectory 404 provides the launch conditions 411 for the projectile, as well as the position of the projectile over time. One or more metrics may be calculated from the 3D trajectory 404; for example, a carry distance 412 may be determined as the horizontal distance that the projectile travels after launch and before hitting the ground at point 405. In one or more embodiments, the carry distance calculation may also take into account known or estimated topography of the ground. One or more embodiments may calculate any other desired metrics such as for example, without limitation, time of carry, velocity at impact with the ground, and estimated roll or bounce.

Figure 5:
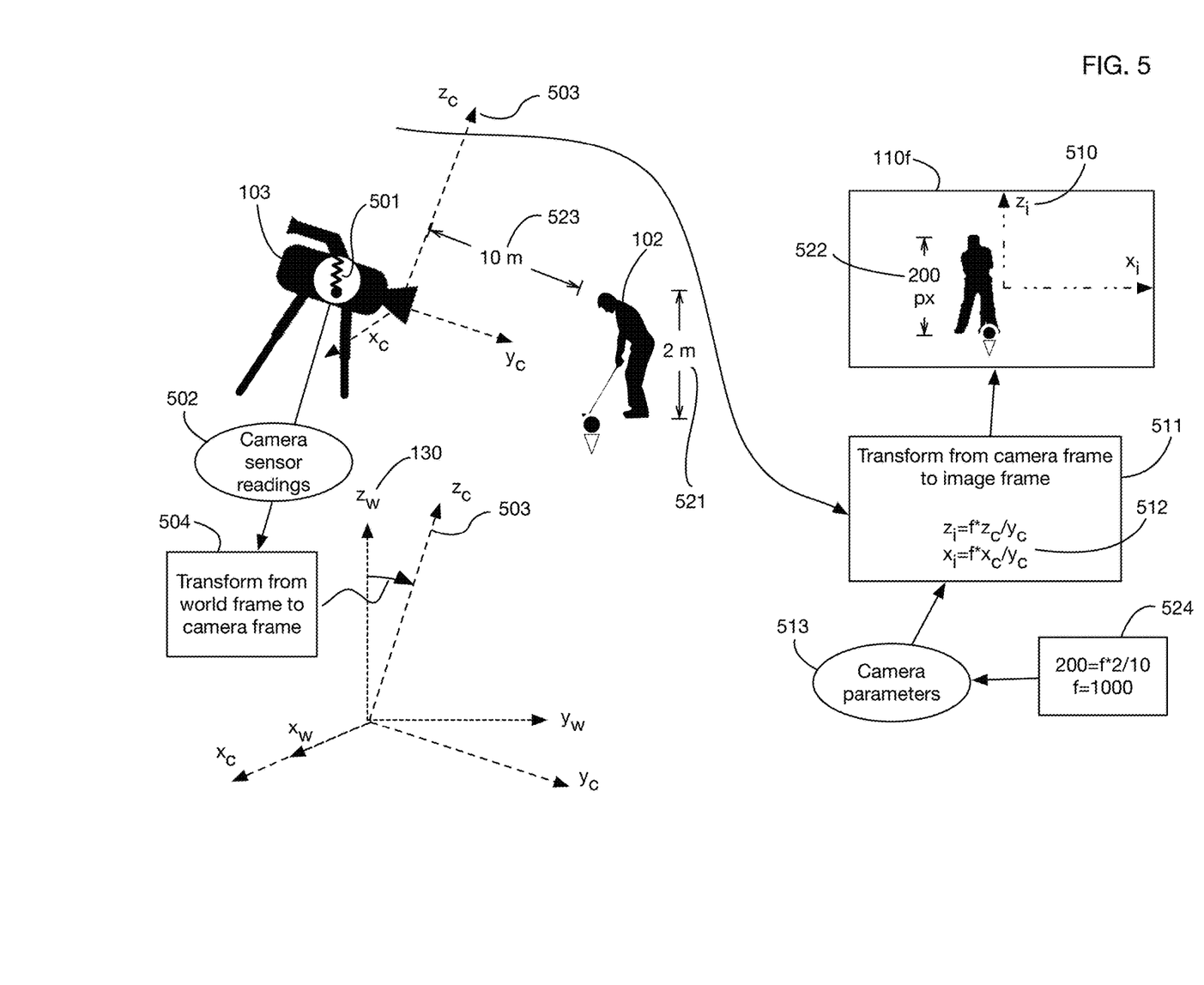
FIG. 5 illustrates an approach to deriving a camera projection transform based on measured camera orientation and based on measured or known camera parameters.

FIG. 3 shows how a camera projection transform 310 may be used to map from 3D points into pixel coordinates. FIG. 5 illustrates an approach to deriving a camera projection transform that may be used in one or more embodiments. The camera projection transform may be viewed for example as the composition of a transformation from a world frame to a camera frame and a transformation from a camera frame to an image frame. A camera reference frame 503 may be defined with a fixed orientation relative to camera 103. For example, the origin of the camera reference frame may be placed at the camera aperture, with the camera frame axis $y_c$ perpendicular to the camera image plate. For simplicity, a world reference frame 130 may be placed at the same origin point, so that the transformation between the camera frame and the world frame is a rotation. This world frame may for example be defined with the $z_w$ axis pointing vertically upwards (opposite to gravity). A rotation 504 between the world frame and the camera frame may be determined based on a known, assumed, or measured orientation of the camera. For example, in one or more embodiments the camera may have one or more sensors, and measurements 502 from these sensors may be used to derive transform 504. Sensors may include for example, without limitation, a three-axis accelerometer 501 coupled to the camera. (Such an accelerometer may be included in a cell phone with a camera, for example.) Accelerometer 501 may measure the gravity vector in the camera reference frame; this measurement may be used to derive rotation 504 that rotates $-z_c$ the axis of the world reference frame into this camera frame gravity vector. If a camera has other sensors such as a magnetometer, then it may also be possible to derive the horizontal orientation of the camera relative to a fixed Earth reference frame; otherwise the world reference frame axis $y_w$ may for example be set to be aligned with the projection of the camera $y_c$ axis onto the world horizontal plane.

Derivation of the camera projection transform may also include calculation of a transform 511 from the camera reference frame 503 to an image frame 510 that provides the pixel coordinates of each point in an image such as frame 110f captured by camera 103. This transform 511 may depend for example on one or more camera parameters 513. Using for example a pinhole camera model, this transformation 511 may be expressed as transform 512, which depends on a single parameter f of the camera. In one or more embodiments, other camera parameters may be used or measured to determine the transform 511. For example, one or more embodiments may perform camera calibration procedures as desired to account for any imperfections in the camera lens or other deviations from a pinhole model 512.

With pinhole camera model 512, the parameter f may be obtained from camera specifications or it may be measured. One approach to measuring this parameter is illustrated in FIG. 5: an object of known physical size is captured at a known distance from the camera, and the size in pixels of the object's image may be used to determine the camera parameter. In the example shown in FIG. 5, the height of golfer 102 is known to be 521; the distance of the camera 103 from the golfer 102 is known to be or measured as distance 523; and the height of the golfer's image in frame 110f is 522. Using these measurements, calculation 524 determines the camera parameter f.

Figure 6:
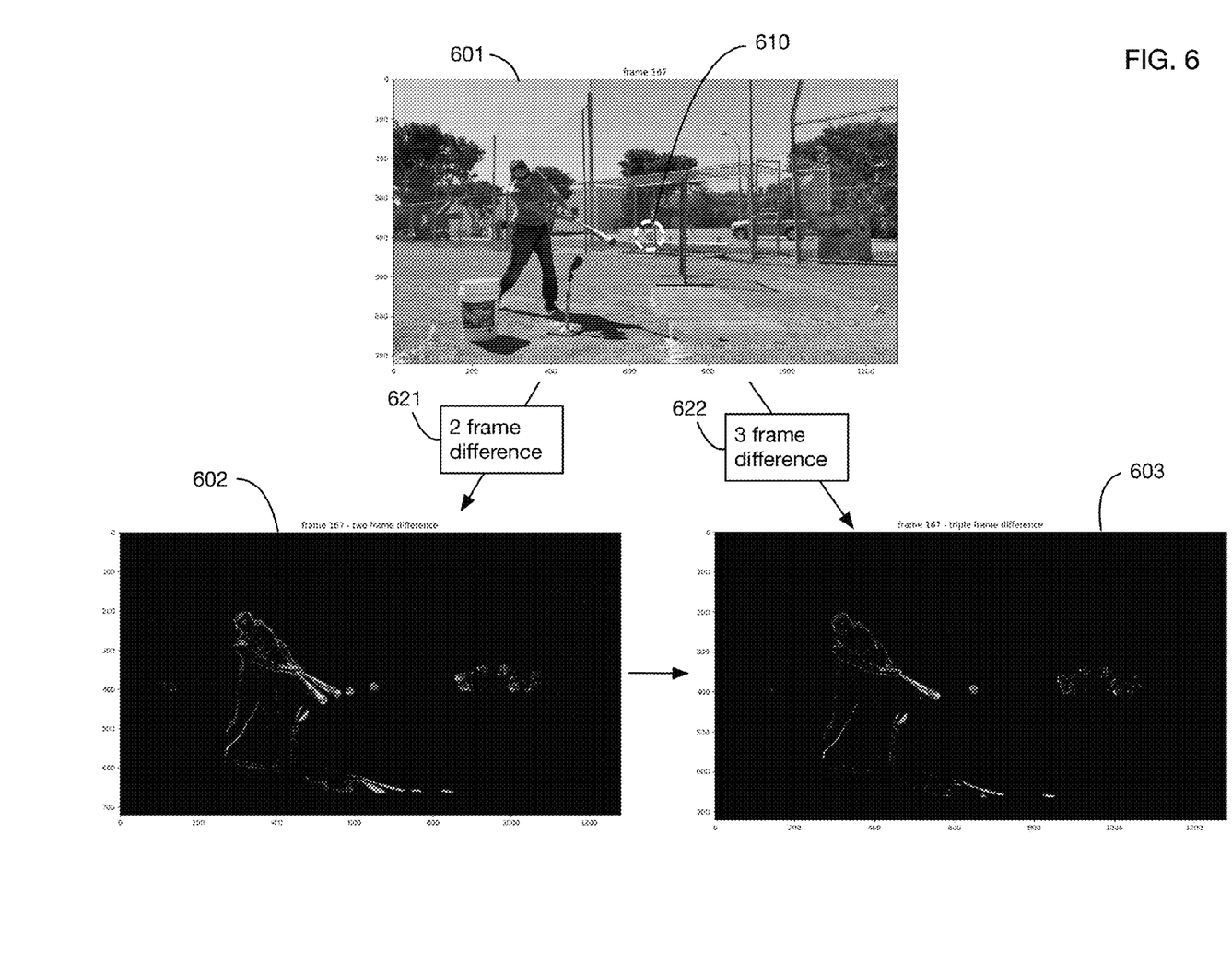
FIG. 6 illustrates a first step that may be used to locate a projectile in a sequence of camera images; in this step, a three-frame difference is applied to a frame sequence to locate moving objects.
Figure 7:
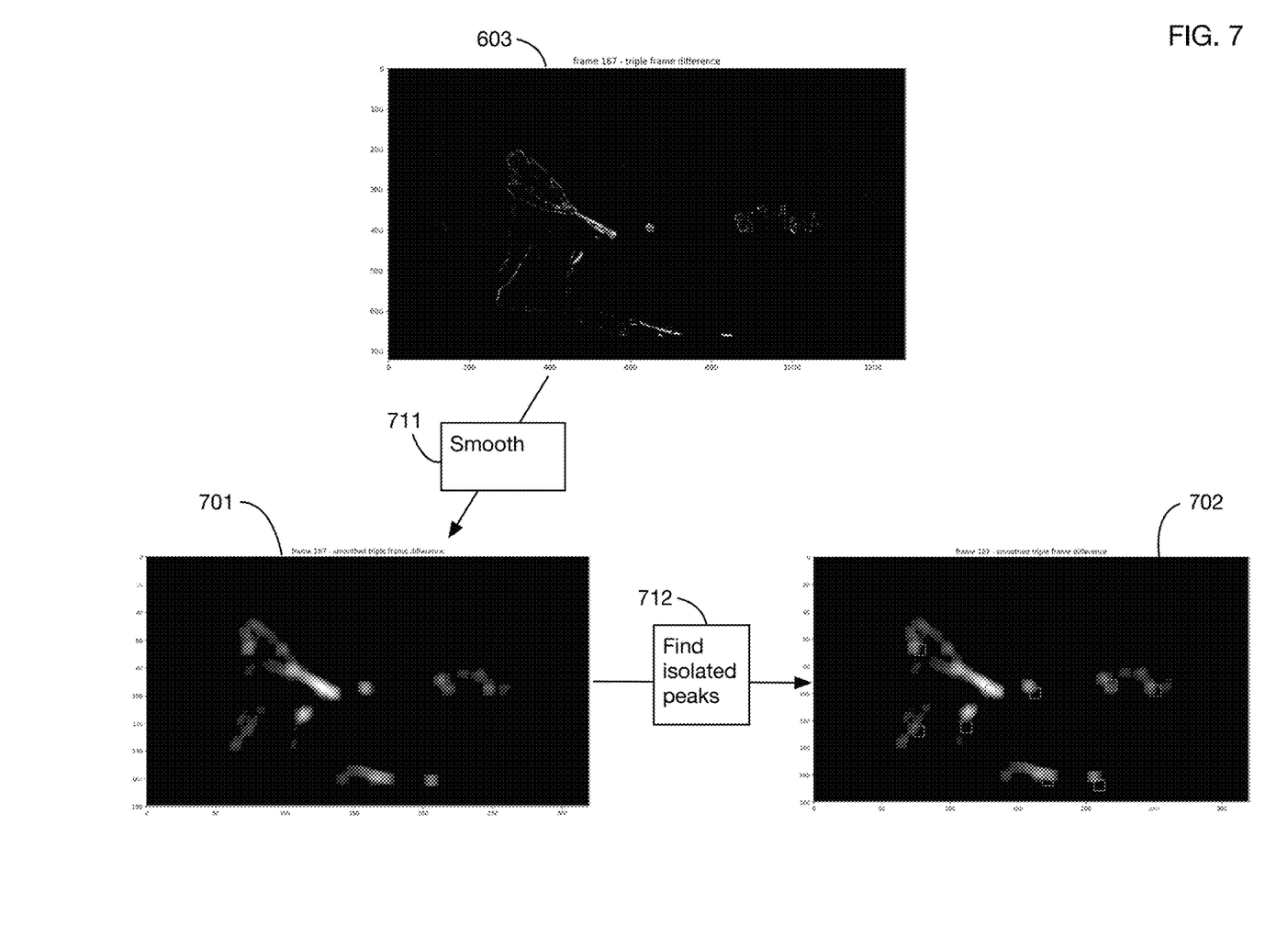
FIG. 7 illustrates a second step that may be used to locate a projectile in a sequence of camera images; in this step, the three-frame difference (from FIG. 6) is smoothed and isolated peaks are identified as possible projectile locations.
Figure 8:
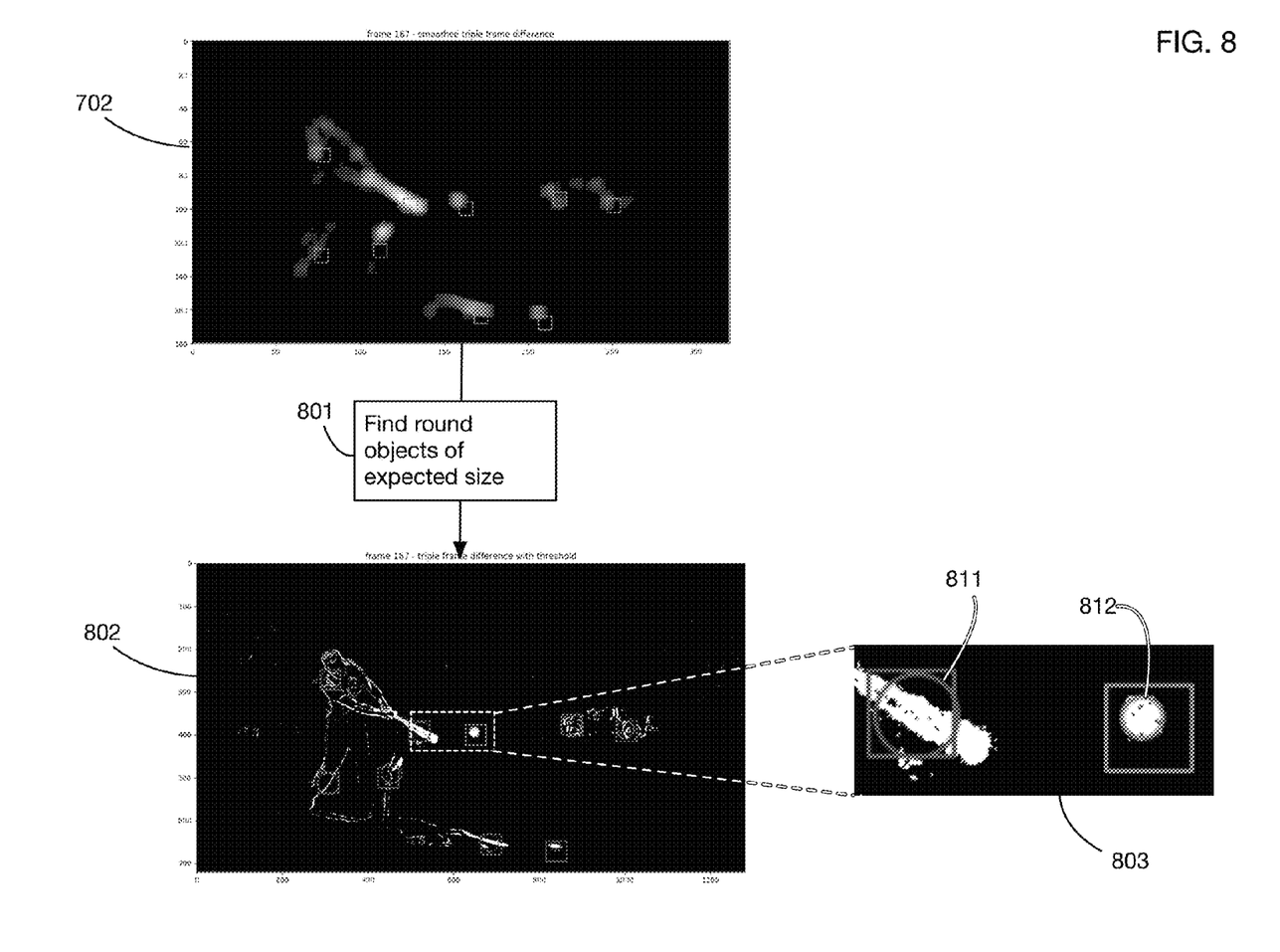
FIG. 8 illustrates a third step that may be used to locate a projectile in a sequence of camera images; in this step, the isolated peaks are filtered to locate round objects of the expected size.

FIGS. 6, 7, and 8 illustrate an approach to locating the pixel position of the projectile in camera images, which may be used in one or more embodiments. FIG. 6 illustrates an initial step in this process, which is to locate moving objects in camera image frames. An illustrative camera image frame 601 contains an image 610 of a moving ball, and it is desired to identify the position of the ball in this and other camera frames. A two-frame difference 621 may be applied to frame 601 and the preceding frame to identify moving objects; however, the resulting difference image 602 shows a moving object twice: once at its previous position (where the object moved from), and once at its new position (where the object moved to). A three-frame difference 622 may be used to resolve this ambiguity. For example, if camera image frame number k is represented as pixel map $F_k(x,y)$, then a binary 2-frame difference may be defined as $D_{k-1,k}(x,y)=1$ if $|F_{k-1}(x,y)-F_k(x,y)|>T$, else 0 for some threshold value T. A three-frame binary difference $D3_k(x,y)$ may then be defined as a pixel wise And operator (denoted "*") applied to the two frame differences $D_{k-1,k}(x,y)$ and $D_{k,k+1}(x,y)$: $D3_k(x,y)=D_{k-1,k}(x,y)*D_{k,k+1}(x,y)$. This method of defining and calculating a three-frame difference 622 is illustrative; one or more embodiments may use any desired method to identify moving objects in camera images.

FIG. 7 continues the example of FIG. 6. Three-frame difference 603 locates moving objects. In this example, several moving objects are visible, such as the ball (which is the projectile of interest), the bat, the batter, and a truck in the background. The three-frame difference 603 may be spatially smoothed with a smoothing filter 711. For example, without limitation, filter 711 may be a square window moving average filter, with the size of the filter matching the largest expected size of the projectile of interest (here, the ball). In one or more embodiments, three-frame differencing and spatial smoothing may be performed at reduced image resolution, for increased efficiency. Image 701 shows a downsampled image after spatial smoothing operation 711.

To locate candidate positions for the projectile, step 712 may be performed to find isolated peaks in the smoothed (and possibly downsampled) image 701. Specifically, one or more embodiments may use the following algorithm to find isolated peaks:

(1) List all of the image locations where the filtered value exceeds a detection threshold, and sort by value in descending order.

(2) If the list is empty, stop.

(3) Select the first location from the list.

(4) Remove all locations from the list that are within some distance of the selected value.

(5) Go to step (2).

Image 702 shows all the detected isolated peaks in the filtered image. The boxes represent the moving average filter, centered on the detected moving object (for computation efficiency, the filtered value is stored in the box's upper-left corner).

FIG. 8 continues the example of FIGS. 6 and 7. The candidate projectile locations are indicated by the boxes in image 702, where the upper left corner of each box is a possible projectile location. Step 801 scans these candidate locations to identify those that match the expected size and shape of the projectile. In this example, the projectile is round (it is a ball), so the search 801 looks for round objects of an expected size. An illustrative approach that may be used to find round objects is to perform the following steps for each detected isolated peak:

(1) Center a box of some size at the detected location (2) List all pixels within the box that exceed a threshold detection value (3) Calculate the centroid of those pixels.

(4) Find the average distance of those pixels to the centroid.

(5) Roughly estimate the ball size as 1.5 times the average distance (6) Count the pixels that are within the estimated ball size (7) Estimate the density by dividing the number of pixels from step (2) by the ball area (8) Keep detections where the density exceeds a threshold (e.g., 0.5)

The result of this procedure is illustrated in image 802, with close-up view 803 of a portion of the image. The red boxes and circles in 802 and 803 show detected locations that are rejected by the above algorithm; the single blue box shows the detected ball that remains. In close-up view 811, the red circle 811 and the blue circle 812 are the circular areas determined via the steps (3), (4), and (5) above. The detected pixels within circle 812 almost fill the circular area, since the shape matches the desired circular shape. In circle 811, however, the pixels within the circle do not fill a large fraction of the circular area since the actual shape of the baseball bat is elongated and not circular; hence this object is rejected as a candidate for the projectile.

In the example shown in FIG. 8, only a single location remains as a candidate for the projectile pixel location. In some situations, multiple locations may remain and it may be desirable to further filter detected objects based on tracking those objects across frames in order to find and estimate valid projectile trajectories. Objects with tracks that do not match expected projectile trajectories (for example, those that are moving too fast, too slow, or in unexpected directions) may be eliminated.

A brute-force approach to target tracking examines all possible combinations of measurements across multiple frames as possible objects to track. In software, an efficient way to handle the possible combinations of measurements is to use a tree-like data structure where with every new frame, every possible track expands by the number of new measurements plus a possible missed detection. The number of combinations expands exponentially and can quickly become intractable. For example, if there are two objects detected in every frame, then there are $(2+1)^{168} \approx 1 \times 10^{80}$ possible combinations after just 168 frames (1.4 seconds at 120 Hz), which is about the number of atoms in the known universe. To keep the problem tractable, the state-of-the-art in multi-target tracking uses a two-stage approach to aggressively prune the tree. The first stage, usually called "gating", rejects measurements that can't possibly match an existing track. In the second stage, the tracker uses all the information up to and including the current frame to "score" each of the possible tracks and a binary linear programming solver to find the K best "assignments" of measurements to objects (see Katta G. Murty, An algorithm for ranking all the assignments in order of increasing cost, Operations Research, Vol. 16, No. 3, pp. 682-687, May-June, 1968). At that point, all branches that are not included in the K best solutions are pruned from the tree.

Because finding the K-best solutions is still computationally intensive, simple trackers may use sub-optimal pruning criteria. For example, a "greedy" tracker only allows one measurement—the one with the best fit—to extend any particular track in each frame, even if there is significant ambiguity. Because we are tracking one moving object with relatively simple kinematics, one or more embodiments may for example use the following greedy tracking algorithm:

(1) Start with an empty set of tracks, T.

(2) Set the "pending" track to none.

(3) Get a new frame with its set of moving objects, M.

(4) For each moving object m in M:

(5) For each track t in T:

(6) If m looks like a valid extension of t:

(7) Create a new track that adds moving object m to track t.

(8) Increment the "used" count if t meets criteria for a "mature" track.

(9) If the "used" count meets some threshold, break.

(10) If m is not "used", start a new track with only measurement m.

(11) For each track t in T:

(12) Increment the miss count for track t.

(13) If the miss count exceeds a threshold:

(14) Remove t from T.

(15) Determine whether t should replace the current "pending" track.

(16) If the "pending" track ages out, estimate the trajectory, report it, and reset to none.

(17) Add all new tracks from steps 7 and 10 to T, and sort T by descending number of measurements.

(18) Repeat from step 3.

Objects must pass several "gates" to look like a valid extension in step 6. These may include (but are not limited to) minimum speed, maximum speed, projected position, estimated ball size, and ball color. The idea is to make the gates computationally efficient and to fail as fast as possible if it doesn't look like a valid trajectory.

The criteria for a "mature" track may for example be a minimum number of measurements. This greedy algorithm allows a measurement to extend up to N mature tracks (N=1 for most greedy trackers), and extension of any mature track prevents the measurement from forming a new track. In this way, we allow "unused" measurements to start possible new tracks, and these are quickly pruned if they are not extended.

Because we are only interested in one moving object (the hit ball), we keep track of a single "pending" track that we will report after any ambiguity is resolved. We sort out redundancies and other unwanted tracks (e.g., ball pitch vs. ball hit) when we replace the "pending" track in step 15. The age-out time for reporting a track in step 16 may be for example about one second, which is enough time to sort out possible ambiguity with club backswing, downswing, pitched ball or other tracks and fast enough to provide real-time feedback after the action is complete. An illustrative pending track replacement strategy is as follows:

(1) Reject tracks that don't match validation criteria (minimum number of measurements, distance tracked, speed, launch angle, field angle, etc.). The later criteria require estimation of the 3D trajectory from the observed measurements.

(2) Reject tracks that don't match any user-provided criteria (e.g., initial ball position).

(3) If the tracks share some measurements, keep the one with the most measurements.

(4) If the tracks represent different objects moving the same direction (e.g., left-to-right), pick the one that we track the farthest.

(5) If the tracks represent objects moving in different directions (e.g., pitch then hit), pick the later one.

Before replacing or reporting a pending track, it may be necessary or desirable to first estimate its 3D trajectory, including initial position and velocity (speed, launch angle, and field angle).

Figure 9:
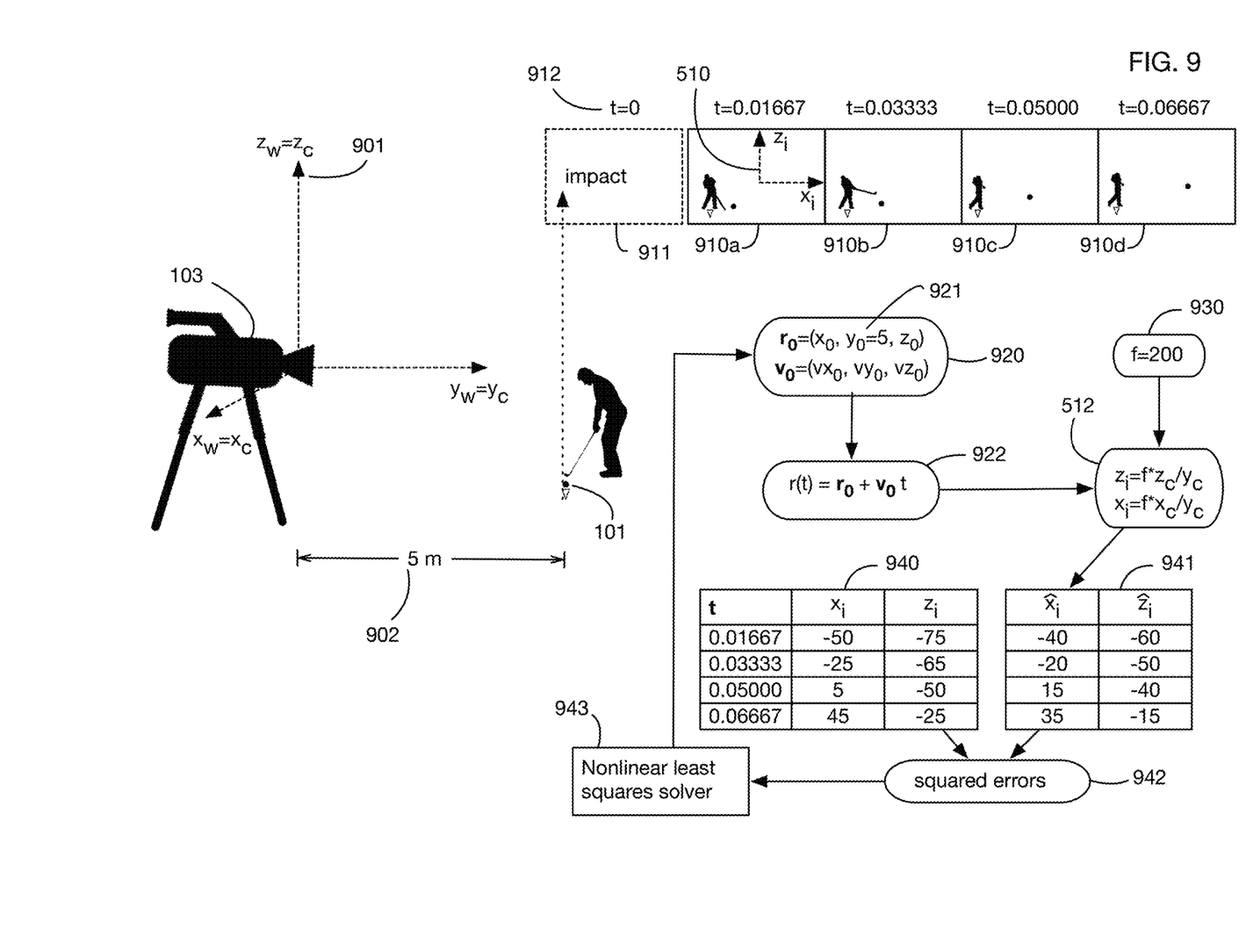
FIG. 9 shows an example of an algorithm to estimate the initial conditions for a projectile based on observed projectile pixel locations and camera projection parameters; this algorithm uses nonlinear least squares to minimize differences between actual and estimated projectile pixel locations.
Figure 10:
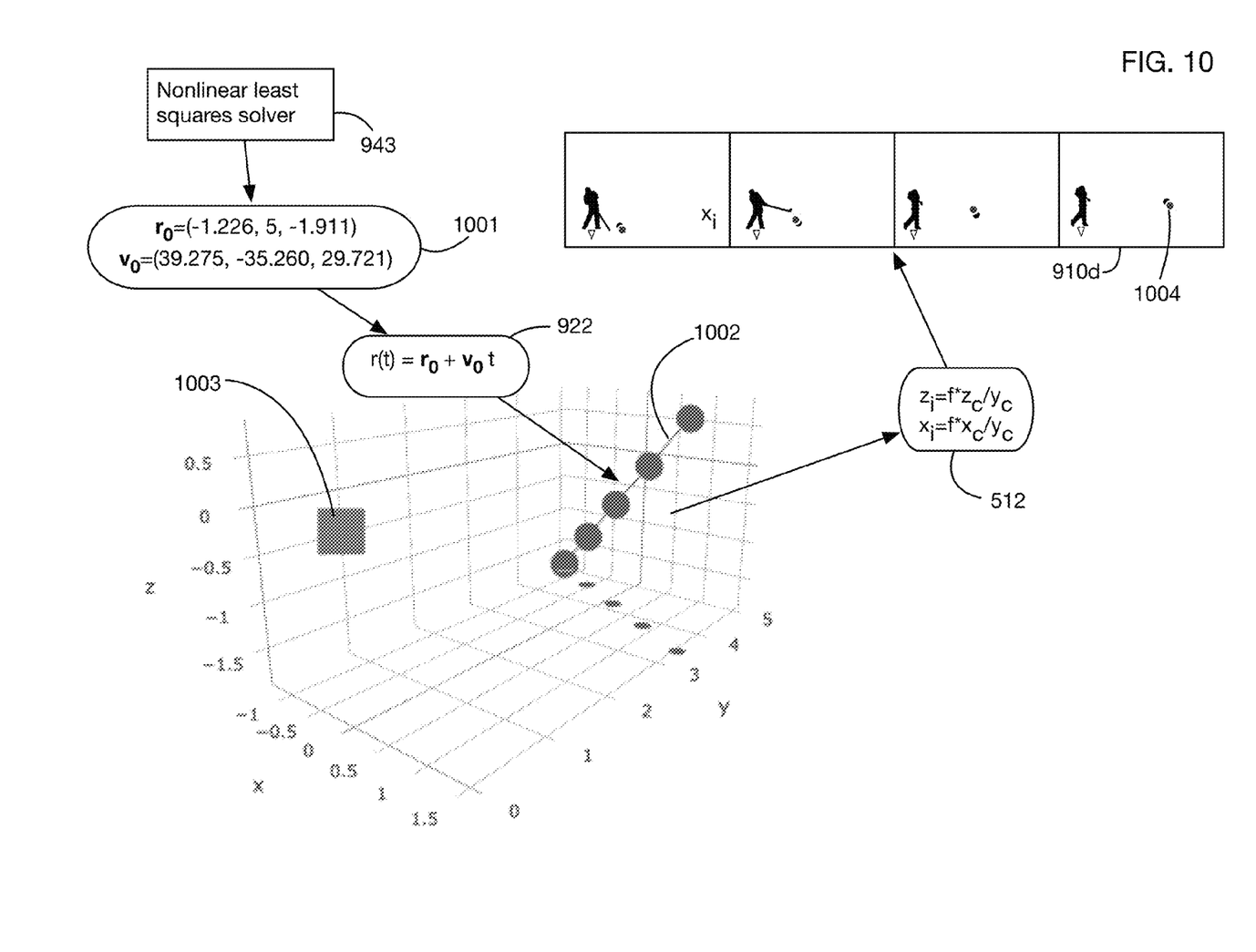
FIG. 10 shows the 3D projectile trajectory determined from the example calculations of FIG. 9.

FIGS. 9 and 10 show an example of calculation of initial conditions and a 3D trajectory from the observed pixel locations of a ball, presuming for example that the ball pixel locations have been identified as described with respect to FIGS. 6, 7, and 8. Camera 103 captures frames 910a, 910b, 910c and 910d, each of which contains an image of the projectile. For simplicity in this example, camera 103 is presumed to be pointing horizontally; therefore, the camera reference frame 901 coincides with the world reference frame.

In order to derive projectile initial conditions from the observed pixel locations of the projectile from a single 2D camera, it may be necessary to impose one or more constraints on the initial conditions. A pixel location does not determine a unique point in 3D space; instead it determines a ray of points. To remove this ambiguity, one or more embodiments may fix the value of one initial condition parameter, such as for example the y coordinate of the projectile (in the world reference frame) at the time of impact. This y coordinate may represent the distance (along the horizontal plane) between the camera and the projectile at the beginning of flight of the projectile. One or more approaches may be used to estimate this distance, including for example, without limitation:

1. Asking the user to measure and provide the distance (e.g., how far is the camera away from the flight path of the ball?).

2. Adding a grid, box, club, bat, or other scaled object to the image display and asking the user to move forward or backward until the scaled object matches the size of a known object in the real world. For example, drawing a virtual 32" bat and then aligning it to a real 32" bat. Again, this distance is then used to compute the world position of subsequent actions.

3. Recognizing an object of know size in the image (automatically or with assistance from the user). For example, recognizing a golf ball or baseball, measuring its size in the image, and comparing it to the known size of a golf ball or baseball to determine its distance. This can be done statically as part of a setup process or dynamically during ball flight.

4. Using gravity by measuring the path of a falling object, calculating its downward acceleration in image coordinates, and scaling that acceleration to match the known acceleration of gravity. This can be done as a setup step where a user drops a ball or other object at the desired distance or dynamically during ball flight, assuming that the effect of gravity is observable in the field of view.

5. Using dual camera systems on modern smart-phone devices. For example, beginning with iPhone 7+, a dual camera system can provide a distance map corresponding to objects in the image. This may be done as part of a setup step (e.g., by locating the ball or other object in the image and remembering the distance), or during real-time processing (although currently no known devices support depth information at high frame rates).

6. Using ARKit or similar APIs to learn the mapping from image to world frames. This approach is only feasible as part of a setup step where the user moves the camera sufficiently to establish the 3D world model and then identifies an object or location at a known distance. For example, this approach can be used to project a line on the ground X feet in front of the camera that the user can then align with the desired launch position in the image.

7. Using multiple cameras to obtain images from different perspectives.

In the example of FIG. 9, distance 902 between camera 103 and the projectile 101 is obtained using one or more of the above methods. In some situations, it may also be desirable to determine or estimate the time at which the projectile is at this distance from the camera, in order to synchronize the initial conditions with the time scale for the captured camera image frames. This initial time may be for example the time at which the projectile receives an impact, such as the time it is struck by a golf club (as in FIG. 9) or another object like a baseball bat. In some cases, sensors may measure an impact (such as for example a shock sensor on a club), and the time of impact may be known. In some cases, it may be desirable to estimate the impact time from the camera images. For example, in FIG. 9 frame 910a may be the first frame where the moving projectile is detected. Therefore, it may be reasonable to project that the time of impact was in the frame 911 preceding frame 910a. In some cases, a manual review of camera images may be used to identify the frame containing or closest to the time of impact.

In the example of FIG. 9, frame 911 is set as the frame of impact, and is assigned a timestamp 912 of t=0. Assuming for example that camera 103 captures frames at 60 frames per second, the timestamps for subsequent frames 910a through 910d may be calculated. The initial conditions 920 at time 912 contain 5 unknown parameters, with the y parameter 921 is set to the known or measured distance 902. For this example, a simple physics model 922 is used that presumes no forces on the ball for the initial period after impact. This physics model provides the 3D position of the ball at each period of time, in the world reference frame 901. This position is then mapped via camera projection transform 512 into image coordinates 510. In this example, camera parameter 930 is assumed known or measured.

The observed pixel locations 940 of the projectile in frames 910a through 910d are compared to the projected pixel locations 941, which are a function of the unknown initial conditions 920. A nonlinear least squares solver 943 is used to minimize the sum of squared errors 942 between the observed pixel locations 940 and the projected pixel locations 941. This solver 943 determines the value of initial conditions 920 that minimizes the errors 942.

The result of this procedure is illustrated in FIG. 10. The initial conditions 1001 calculated by the nonlinear least squares solver 943 minimize the squared errors 942. With these initial conditions, the physics model 922 generates 3D trajectory 1002 for the ball. (For visualization, the projection of the trajectory positions onto the horizontal plane are also shown.) The camera position 1003 is also shown. It is clear that the trajectory of the ball is angled towards the camera. Camera projection transform 512 maps the 3D trajectory 1002 into predicted pixel locations (shown in blue), such as predicted position 1004 in frame 910d, showing a close fit between the observed and predicted pixel locations.

One or more embodiments may use multiple cameras and may derive a 3D projectile trajectory by analyzing the images of a projectile from these multiple cameras. Each camera may view the projectile from a different angle, providing measurements of ball location in its own image frame. The "slave" camera or cameras may for example share their measurements with a single "master" camera (or with another coordinating system) that puts all measurements together into a joint measurement vector.

As described above, each camera can determine the full 3D trajectory with the exception of a single scale factor (based on the distance of the camera to the initial ball position). If we knew the distance from one camera, then we would know the actual speed of the ball, and we would also know the distance to the other camera. No matter how many cameras we have, we have one unknown scale factor (we can "zoom" in or out the entire geometry and all measurements remain the same). All we need is one more parameter to solve the unknown. Unlike the single-camera case where it's necessary to know the distance to the ball, now we can use the relative distance between any two of the cameras, which are fixed. This distance could be derived for example from the GPS positions of the cameras (we only need relative position, which is much more accurate than absolute), or it could be the measured distance between any of the two cameras provided by the user.

To solve the multi-camera problem, we may first augment the measurement vector to include any measured or user-provided camera position information (for example, GPS positions of all the cameras). We may then augment the state vector with the remaining unknowns, including the initial position and velocity of the ball, the time bias of each of the slave cameras, and any remaining camera position information (for example, the unknown pointing direction of each of the slave cameras relative to the master). A rough initial guess of all the state space parameters can be calculated from the raw measurements. The algorithm then iterates to find the state vector that minimizes the objective function. All it takes is a single scale factor constraint in the measurement function for the state space to be fully observable.

While the invention herein disclosed has been described by means of specific embodiments and applications thereof, numerous modifications and variations could be made thereto by those skilled in the art without departing from the scope of the invention set forth in the claims.

What is claimed is:

1. A method for estimating a 3D trajectory of a projectile from 2D camera images, comprising:
   obtaining a sequence of 2D camera images from a camera, wherein one or more 2D camera images of said sequence of 2D camera images comprise an image of a projectile;
   identifying a pixel location of said projectile in each 2D camera image of said one or more 2D camera images;
   calculating a camera projection transform that maps points in a world reference frame into pixel positions in said sequence of 2D camera images;
   calculating a model that maps projectile initial conditions into a modeled pixel position for said projectile in each 2D camera image of said one or more 2D camera images, wherein said projectile initial conditions comprise
      an initial position vector in said world reference frame for said projectile; and,
      an initial velocity vector in said world reference frame for said projectile; and,
   calculating estimated projectile initial conditions as projectile initial conditions that minimize differences between said modeled pixel position for said projectile and said pixel location of said projectile across said one or more 2D camera images.

2. The method of claim 1, wherein said projectile comprises one or more of a golf ball, a baseball, a softball, a soccer ball, a football, a hockey puck, a tennis ball, a table tennis ball, a squash ball, a racket ball, a shuttlecock, a handball, a lacrosse ball, a field hockey ball, a volleyball, a kickball, a horseshoe, and a lawn dart.

3. The method of claim 1, further comprising:
   calculating an estimated projectile trajectory in said world reference frame based on said estimated projectile initial conditions and on a projectile physics model.

4. The method of claim 3, wherein said projectile physics model comprises a model of forces on said projectile, wherein said forces comprise
   gravity, and
   drag.

5. The method of claim 4, wherein
   said forces further comprise a Magnus effect force; and,
   said projectile physics model further comprises an estimate or calculation of an initial spin of said projectile.

6. The method of claim 3, further comprising:
   calculating an estimated carry distance for said projectile as a horizontal distance between said initial position vector of said estimated projectile initial conditions and a point on said estimated projectile trajectory where said projectile contacts a horizontal plane.

7. The method of claim 1, wherein said calculating said camera projection transform comprises:
   defining a camera reference frame fixed to said camera;
   calculating a transformation between said world reference frame and said camera reference frame; and,
   calculating a transformation between said camera reference frame and said pixel positions based on one or more camera parameters.

8. The method of claim 7, further comprising:
   measuring a size in pixels of a camera image of an object of a known size at a known distance to determine one or more of said one or more camera parameters.

9. The method of claim 7, wherein said calculating a transformation between said world reference frame and said camera reference frame comprises:
   measuring an orientation of said camera in said world reference frame using one or more sensors coupled to said camera; and,
   calculating said transformation between said world reference frame and said camera reference frame from said orientation of said camera in said world reference frame.

10. The method of claim 9, wherein
    said one or more sensors coupled to said camera comprise a three-axis accelerometer;
    said measuring said orientation of said camera in said world reference frame comprises obtaining a measured gravity vector using said three-axis accelerometer; and,
    said transformation between said world reference frame and said camera reference frame comprises a rotation that rotates a vertical gravity vector in said world reference frame to said measured gravity vector.

11. The method of claim 1, wherein said identifying a pixel location of said projectile in each 2D camera image comprises:
    applying a three-frame difference algorithm to identify one or more moving objects in said one or more 2D camera images, yielding one or more difference frames;
    applying a moving average filter to said one or more difference frames, wherein a size of said moving average filter matches a largest expected pixel size of said projectile, yielding one or more filtered images; and, identifying isolated peaks in said one or more filtered images as potential pixel locations of said projectile, wherein each isolated peak of said isolated peaks has a value that exceeds a detection threshold and is separated from other potential pixel locations of said potential pixel locations by a distance that exceeds a distance threshold.

12. The method of claim 11, wherein
said projectile is a ball; and,
said identifying a pixel location of said projectile in each 2D camera image further comprises:
filtering said potential pixel locations of said projectile to retain only pixel locations of objects that are substantially round.

13. The method of claim 12, wherein said filtering said potential pixel locations of said projectile to retain only pixel locations of objects that are substantially round comprises:
for each potential pixel location of said potential pixel locations of said projectile,
identifying candidate pixels within a region surrounding said potential pixel location that have a pixel value exceeding a value threshold;
determining a centroid of said candidate pixels;
calculating an average distance between said candidate pixels and said centroid;
calculating a disc having a center at said centroid and a radius of 1.5 times said average distance;
determining the fraction of pixels within said disc that are candidate pixels; and,
retaining said potential pixel location when said fraction exceeds a density threshold.

14. The method of claim 1, further comprising:
fixing one coordinate of said initial position vector in said world reference frame based on a measured or assumed distance between said camera and said initial position vector; and,
obtaining or calculating an initial time for motion of said projectile, wherein
said initial position vector corresponds to a position of said projectile at said initial time, and
said initial velocity vector corresponds to a velocity of said projectile at said initial time.

15. The method of claim 14, wherein said calculating estimated projectile initial conditions comprises:
obtaining a nonlinear least-squares solution that minimizes the sum of squared distances between said modeled pixel position for said projectile and said pixel location of said projectile across said one or more 2D camera images, wherein parameters of said model comprise two unknown coordinates for said initial position vector and three unknown coordinates for said initial velocity vector.

16. The method of claim 15, wherein said calculating said model comprises:
calculating or obtaining a time for each 2D camera image of said one or more 2D camera images;
mapping said time for each 2D camera image into a projectile location in said world reference frame based on
said projectile initial conditions, and
a physics model for an initial period of said 3D trajectory of said projectile;
mapping said projectile location in said world reference frame into said modeled pixel position based on said camera projection transform.

17. The method of claim 16, wherein said physics model for said initial period of said 3D trajectory comprises inertial motion starting at said initial position vector with a uniform velocity equal to said initial velocity vector.

18. The method of claim 16, wherein said physics model for said initial period of said 3D trajectory comprises a model of forces on said projectile, wherein said forces comprise gravity.

19. The method of claim 18, wherein said forces further comprise drag.

20. The method of claim 19, wherein
said forces further comprise a Magnus effect force; and,
said physics model for said initial period of said 3D trajectory further comprises an estimate or calculation of an initial spin of said projectile.

* * * * *